United States Patent [19]

Dinh

[11] Patent Number: 4,483,319
[45] Date of Patent: Nov. 20, 1984

[54] SOLAR POWER SUPPLY FOR LOAD REQUIRING HIGH STARTING CURRENT

[75] Inventor: Khanh Dinh, Gainesville, Fla.

[73] Assignee: Pulstar Corporation, Gainesville, Fla.

[21] Appl. No.: 485,502

[22] Filed: Apr. 15, 1983

[51] Int. Cl.³ .............................................. F24J 3/02
[52] U.S. Cl. .................................... 126/417; 126/419; 126/432; 136/244; 363/42
[58] Field of Search .............. 126/417, 432, 437, 419, 126/422; 363/42; 323/283

[56] References Cited

U.S. PATENT DOCUMENTS

| | | |
|---|---|---|
| 2,889,490 | 6/1959 | Paradise . |
| 3,317,809 | 5/1967 | Bowers et al. . |
| 3,621,356 | 11/1971 | On .................................. 250/110 X |
| 3,980,996 | 9/1976 | Greenspan et al. . |
| 4,100,427 | 7/1978 | Durand et al. . |
| 4,122,396 | 10/1978 | Grazier et al. . |
| 4,147,157 | 4/1979 | Zakhariya ........................... 126/419 |
| 4,200,833 | 4/1980 | Wilkerson .......................... 323/283 |
| 4,375,662 | 3/1983 | Baker ................................. 363/42 X |

Primary Examiner—Larry Jones
Attorney, Agent, or Firm—Schwartz, Jeffery, Schwaab, Mack, Blumenthal & Koch

[57] ABSTRACT

The invention comprises a photovoltaic panel for converting solar energy into electric energy, a load and a capacitor connected to the photovoltaic panel for receiving current produced by the panel and storing the current to produce an output voltage which increases with the amount of stored current. A relay connects the photovoltaic panel and capacitor to the inductive load when the output voltage of the capacitor has reached a predetermined level which corresponds to an optimum operating voltage range of the photovoltaic panel.

13 Claims, 1 Drawing Figure

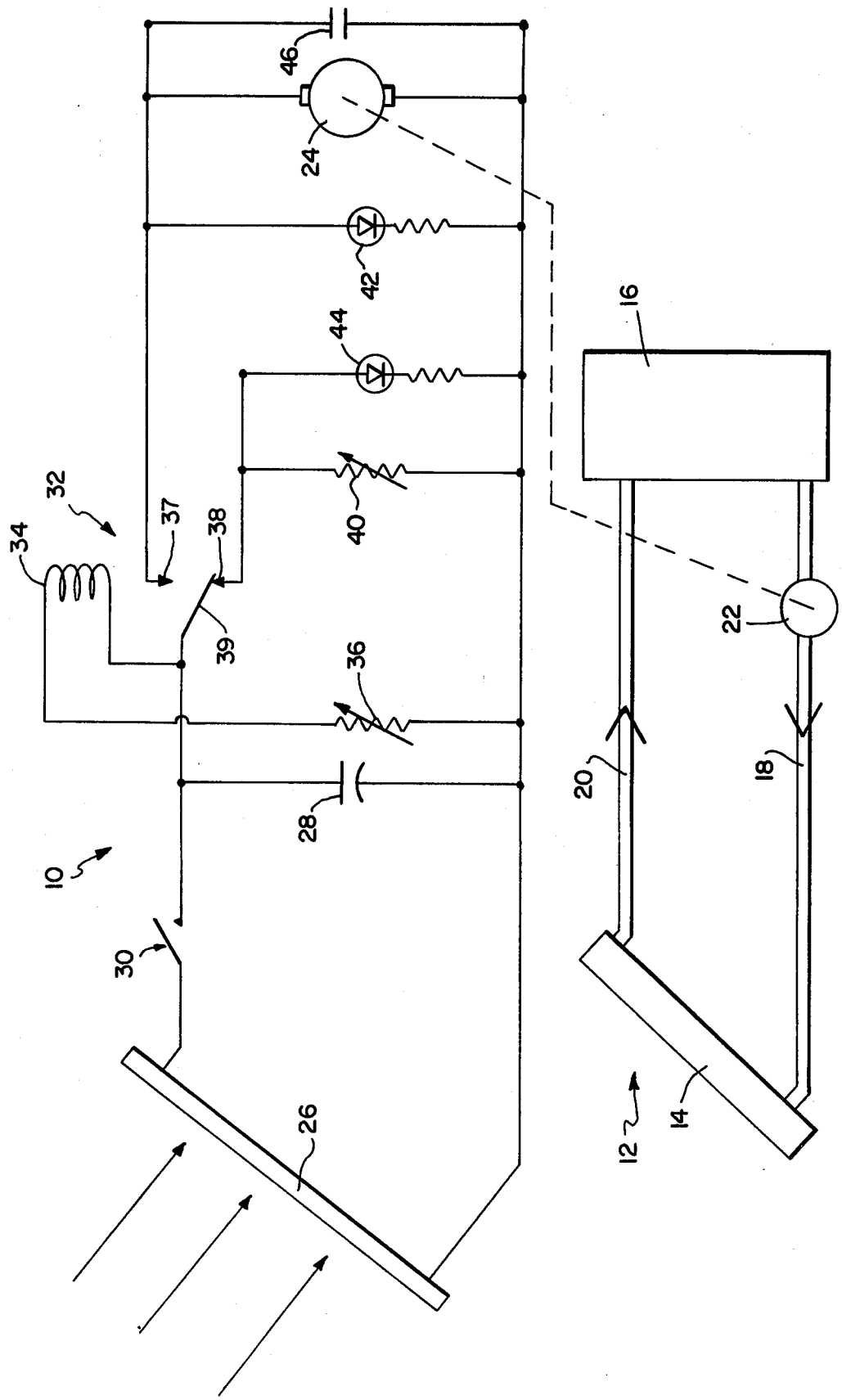

SOLAR POWER SUPPLY FOR LOAD REQUIRING HIGH STARTING CURRENT

BACKGROUND OF THE INVENTION

1. Field of the Invention

This invention relates to systems for converting solar energy into electrical energy, and more particularly to such systems which incorporate a load requiring a high initial starting current.

2. Discussion of Related Art

The use of solar energy as a power source is becoming increasingly more popular, especially in areas that have a relatively constant level of high intensity solar radiation available. One very popular use of solar energy is in producing domestic hot water for heating swimming pools and other uses. Such systems utilize a heat exchange liquid, such as water, which is circulated between a storage tank and a solar collector panel by use of a pump which is normally started and stopped in response to the level of insolation. It is also known to isolate the pump electrical supply from municipal power supply grids by using photovoltaics in order to eliminate the fear of a reduction in efficiency by parasitic power consumption. One example of a circulation pump operated by photovoltaics is disclosed in U.S. Pat. No. 4,147,157 to Zakhariya.

While the use of photovoltaics to operate a domestic hot water circulation pump is attractive from the point of view that the sun controls the systems operation without reliance on an outside electrical source, serious drawbacks of such systems do exist. If the photovoltaic panel is installed with the same orientation as the thermal collector, the panel may take up to 90 minutes to produce a sufficient charge to start the circulation pump. On the other hand, in the evening, the photovoltaic panel may cause the circulation pump to operate too long.

One solution to the problem of late circulation is to orient the photovoltaic array 20° to the east relative to the thermal collector. However, an oversized photovoltaic panel must be used resulting in a higher cost. Furthermore, some systems using larger photovoltaic panels are still plagued with late starts and stops.

Many electrical power supplies have been suggested using solar energy. None of these known systems solves the two problems mentioned above, namely, providing enough current from a photovoltaic panel to start a circulation pump during the morning hours, and controlling the amount of current passed to a circulation pump so that the pump will not operate when insolation is reduced below an effective limit.

U.S. Pat. No. 4,100,427 to Durand et al. shows a device for converting solar energy into electrical energy. In the Durand et al system, a plurality of electric accumulators in the form of batteries are connected to a plurality of photocells. A switching means is provided for connecting a load to the photocells only so that load current is determined by the photocell current during the starting period of the load.

U.S. Pat. No. 4,122,396 to Grazier et al. shows a stable solar power source which includes a capacitive means having a large capacitance connected in parallel with a plurality of interconnected solar cells in order to offset fluctuations in currents applied by the solar cells.

U.S. Pat. No. 2,889,490 to Paradise shows a solar powered light source which produces visible flashes of light in the daytime or nighttime. The system includes an elementary relaxation oscillator comprising a resistor, a capacitor and an inert gas-filled flash tube. The relaxation oscillator is fed from a parallel combination of a solar cell and a battery. During daylight hours, the battery is charged from the solar cell and, at night, the solar cell becomes inoperative.

U.S. Pat. No. 3,317,809 to Bowers et al. shows a self-contained electrical lighting unit which includes a first bank of solar cells connected to recharge a battery, and a second bank of solar cells which actuates a relay. The relay is operative to complete a circuit connecting the battery to the first bank of solar cells or connecting the battery to a light.

U.S. Pat. No. 3,980,996 to Greenspan et al. shows a self-sustaining alarm transmitter device which includes a storage element connected to energize an output transmitting circuit on the occurrence of an alarm condition to maintain the storage element at full charge. A trickle charging circuit is provided which includes an energy conversion device for converting solar energy, broadcase electromagnetic energy, heat energy or the like into an electrical current suitable for charging the storage element.

SUMMARY OF THE INVENTION

One object of the present invention is to provide a circuit for converting solar energy into electrical energy which can be used to power a circulation pump in a solar heating system so that the system can be operated free of any outside electrical power sources.

A further object of the present invention is to provide a circuit for converting solar energy into electrical energy for a load wherein a relatively high current pulse of energy is supplied to the load during a startup period.

An additional object of the present invention is to provide a circuit for converting solar energy into electrical energy which circuit can be adjusted to provide varying levels of starting current to a load.

An even still further object of the present invention is to provide a circuit for converting solar energy into electrical energy wherein electrical current produced during periods of low insolation is dissipated.

In accordance with the above and other objects, the present invention is a circuit for converting solar energy into a starting current for a load comprising a photovoltaic panel for converting solar energy into electrical energy having a voltage and a current, and a charge storage means connected to the photovoltaic panel for receiving current produced by the panel and storing the current to produce an output voltage which increases with the amount of stored current. Means are provided for connecting the photovoltaic panel to the load when the output voltage of the charge storage means has reached a predetermined level corresponding to an optimum operating voltage of the photovoltaic panel.

In accordance with other aspects of the invention, the charge storage means comprises a capacitor and the means for connecting the photovoltaic panel to the load comprises a single pole, double throw relay.

Means are also provided for adjusting the predetermined level at which the photovoltaic panel is connected to the inductive load. Further, means are provided for dissipating current produced by the photovoltaic panel during periods of low insolation so that a minimum level of current must be produced before the circulation pump will be started.

In accordance with other aspects, the present invention is a solar power source comprising a photovoltaic panel and a load requiring a relatively high starting current. The invention includes means for accumulating charge produced by the photovoltaic panel until the panel reaches an optimum operating voltage, and means for connecting the accumulated charge and the photovoltaic panel to the load when the operating voltage has reached the optimum level to produce a surge of initial current for starting the load.

BRIEF DESCRIPTION OF THE DRAWING

The above and other objects of the present invention will become more readily apparent as the invention is more fully described in connection with the following detailed description, reference being had to the accompanying drawing in which like reference numerals represent like parts throughout and which schematically shows a domestic hot water solar heating system incorporating a solar power source according to the present invention.

DETAILED DESCRIPTION OF THE PREFERRED EMBODIMENT

The drawing shows a solar power source 10 according to the present invention connected to a domestic hot water system 12. Hot water system 12 is of conventional design having a solar collector 14 and a storage tank 16. Cold water is circulated from the bottom of storage tank 16 through inflow pipe 18 to collector 14 and hot water is returned through outflow pipe 20 to the top of storage tank 16. This circulation is produced by a pump 22 connected to a drive motor 24. It will be understood that while a domestic hot water system 12 is shown, the solar power source 10 of the present invention could be used to produce energy for any system having a load which requires a high initial current.

Motor 24 is preferably a D.C. motor which can be operated directly by current from a photovoltaic panel 26. As is conventional with all D.C. motors, the current required to initially start the motor is substantially greater than the current required to keep the motor running. This is due to the fact that the voltage across the motor terminals is a function of the input voltage minus the voltage produced by the motor back e.m.f. When the motor is idle, there is no back e.m.f. generated and the voltage seen by the motor is relatively high, thus a relatively large amount of current is drawn. Once the motor begins running, the back e.m.f. increases and the amount of current required is reduced.

Photovoltaic array 22 comprises a plurality of photovoltaic cells connected in series. Each cell can be a silicon-type photovoltaic cell such as an Arco M-81. Silicon photovoltaic cells have an open circuit voltage of approximately 0.8 volts and an optimum operating voltage of 0.42 volts. As is well known, the operating voltage of a photovoltaic cell is a function of the current produced by the cell. Such cells have a high internal resistance and the voltage increases from a minimum to the optimum level as the amount of insolation, and, therefore, the amount of current produced increases. Conventionally, a photovoltaic panel 26 would be connected directly to a motor 24 to operate pump 22. However, such a configuration is inadequate for purposes of starting the motor at the earliest opportune moment based on the amount of solar insolation received. Due to the high current requirements for starting motor 24, insolation of panel 26 would have to reach a relatively high level before sufficient current would be produced.

According to the present invention, a capacitor 28 is placed in electrical parallel connection with the cells of photovoltaic panel 26. An on/off switch 30 is connected between panel 26 and capacitor 28. Also, a relay 32 is connected for actuation in response to the voltage built up on capacitor 28. A coil 34 of relay 32 is connected in series with variable resistor 36. This series combination is connected in parallel with capacitor 28. Normally open contact 37 of relay 32 is connected to motor 24 while normally closed contact 38 is connected to a variable current dissipating resistor 40. A first LED 42 is connected across motor 24 to indicate operation of the motor while a second LED 44 is connected across resistor 40 to indicate that the motor is inactive. An arc suppression capacitor 46 is also connected across motor 24, whenever needed.

In operation, with switch 30 closed, current produced by panel 26 charges capacitor 28 at a rate which is dependent upon the setting of current dissipating resistor 40. When the voltage on capacitor 28 reaches the pull-in voltage of relay 32, as set by variable resistor 36, movable contact 39 of the relay switches to the normally open contact 37. The charge built up on capacitor 28 is then connected directly to motor 24. Capacitor 28 rapidly discharges through motor 24 to provide a relatively high current pulse which causes motor 24 to start. Thereafter, if the output of the photovoltaic panel 26 is high enough to maintain a voltage higher than the dropout voltage of relay 32, motor 24 will continue to run. If the photovoltaic panel 26 does not provide enough current to maintain the motor 24 running, the relay will deactivate and the capacitor charging cycle will repeat itself. When the panel 26 is producing sufficient current to maintain motor 24 running, relay 32 will be pulled in as long as the solar insolation is kept at a desirable level. When solar insolation falls off, relay 32 will drop out and motor 24 will cease operation.

With relay 32 deenergized, resistor 40 will aid in dissipating current produced by panel 26 through normally closed contact 38. Accordingly, during periods of low solar insolation, when the heat generated in solar collector 14 is not sufficient to transfer energy to storage tank 16, pump 22 will not operate. For example, at the end of the day, operation of pump 22 would merely cause the heat from water stored in tank 16 to be dissipated into the atmosphere through collector 14. With resistor 40 in the circuit, the voltage on capacitor 28 will never rise sufficiently to pull in relay 32 during these periods. Resistor 40 can be adjusted to set the level of solar insolation required to heat collector 14.

Capacitor 46 is connected across motor 24 so that the high starting current will not arc between the brushes and commutator of the motor. Capacitor 46 ensures that the voltage rise across the motor will be limited to prevent arcing.

Photovoltaic panel 26 may contain, for example, 33 series connected photocells in which case it is desirable to set the pull in voltage of relay 32 at approximately 8 volts. This voltage ensures that the photovoltaic cells are within their optimum operating range so that maximum current is being produced. In order to provide proper current dissipation, resistor 40 should be set at approximately 100 ohms when used with a solar photovoltaic array of 7 watt and approximately 40 sq. feet, of thermal solar collector.

It should be understood that the present invention enables a D.C. motor to be started from a solar collector at the earliest possibility for the solar collector to maintain the motor running using only the solar collector output. No expensive storage batteries are required since capacitor 28, operating in conjunction with relay 32, provides a sufficient pulse of starting current to motor 24. Capacitor 28 may be a relatively inexpensive 15,000 μf capacitor. The combination of capacitor 28 and relay 32 produces the twofold benefit of supplying an initial high current pulse to motor 24 and disconnecting the load from the photovoltaic panel 26 until the operating voltage of the panel has entered into an optimum operating range so that maximum current generation by the panel is ensured for the available level of solar insolation.

It should be understood that within the determined range of operation the pumping capacity is proportional to the amount of solar radiation.

It will also be understood that various solid-state circuit components could be used in place of relay 32, or components other than resistor 40 could be used to dissipate current. Clearly, the foregoing description is set forth for purposes of illustrating the invention but is not deemed to limit the invention in any manner. Additional modifications could be made to the invention without departing from the scope thereof, as set forth in the appended claims.

What is claimed is as follows:

1. A circuit for converting solar energy into electricity for a load, comprising:
   a photovoltaic panel for converting solar energy into electric energy having a voltage and a current;
   a load requiring a starting current which is higher than the minimum running current;
   charge storage means connected to said photovoltaic panel for receiving current produced by said panel and storing a charge in response thereto; and
   means for connecting said photovoltaic panel and said charge storage means to said load to discharge said charge storage means through said load and produce an initial pulse of starting current through said load when the charge of said charge storage means has reached a predetermined level greater than the output of said photovoltaic panel, wherein said predetermined level corresponds to an operating range sufficient for starting said load, whereby the charge of said charge storage means initially starts said load and the electric energy from said photovoltaic panel maintains said load operational.

2. The circuit as set forth in claim 1 wherein said charge storage means comprises a capacitor.

3. The circuit as set forth in claim 1 wherein said connecting means includes threshold adjustment means for adjusting said predetermined level.

4. The circuit as set forth in claim 1 wherein said connecting means comprises a relay.

5. The circuit as set forth in claim 1 including current dissipation means for dissipating energy produced by said photovoltaic array during period of low insolation.

6. The circuit as set forth in claim 5 wherein said connecting means connects said dissipating means to said photovoltaic array when said load is not connected to said array.

7. The circuit as set forth in claim 5 wherein said dissipation means includes means for adjusting the amount of energy dissipated.

8. The circuit as set forth in claim 6 wherein said connecting means comprises a single pole double throw relay having a first contact connected to said load and having a second contact connected to said dissipating means.

9. The circuit as set forth in claim 1 in combination with a solar heating system comprising a solar collector panel and a circulation pump for circulating liquid through said solar collector panel wherein said load comprises an electric motor connected to said pump.

10. The solar power source as set forth in claim 1 including means to vary the speed of the motor thus the pumping capacity accordingly to the amount of solar radiation available to obtain a steady temperature outlet from the thermal solar collector.

11. A solar power source comprising:
    a photovoltaic panel;
    a load requiring a starting current which is greater than a minimum operating current;
    means for accumulating charge produced by said photovoltaic panel until said stored charge reaches a level for starting said load;
    means for connecting said accumulated charge and said photovoltaic panel to said load when said stored charge has reached said level to discharge said charge storage means through said load to produce a surge of initial current for starting said load.

12. The solar power source as set forth in claim 11, wherein said accumulating means comprises a capacitor connected across said photovoltaic panel.

13. The solar power source as set forth in claim 11 including means connected to photovoltaic panel for dissipating current produced by said panel during periods of low insolation.

* * * * *